June 22, 1965 A. G. NEWBOLD 3,189,958
METHOD OF BONDING INSERTS INTO CASTINGS
Filed May 12, 1961
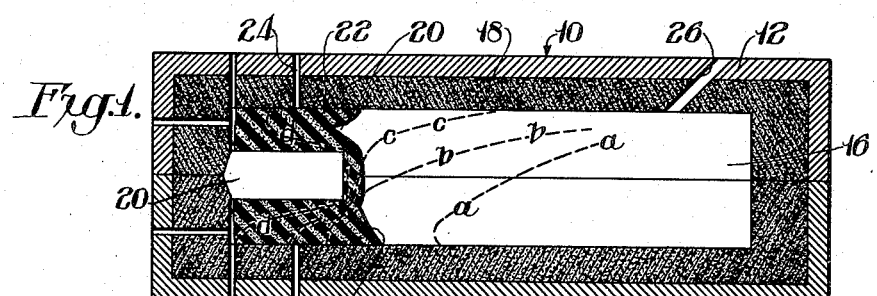
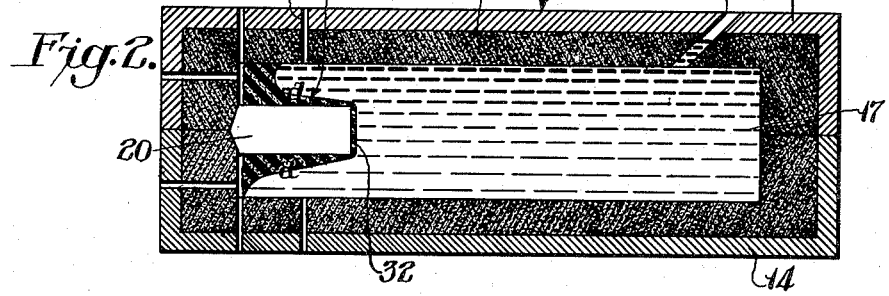
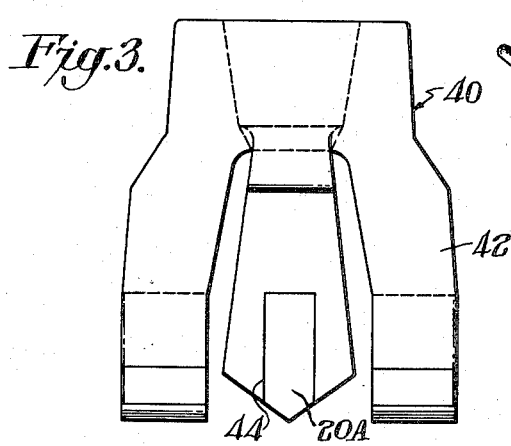
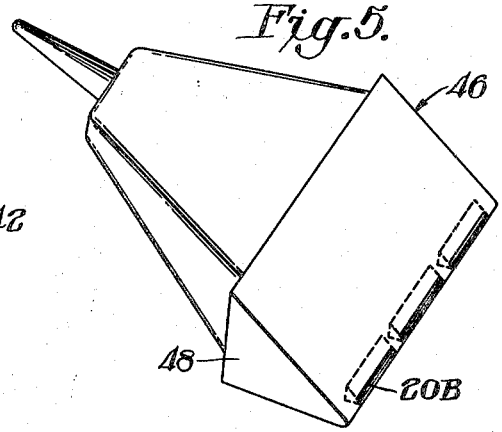
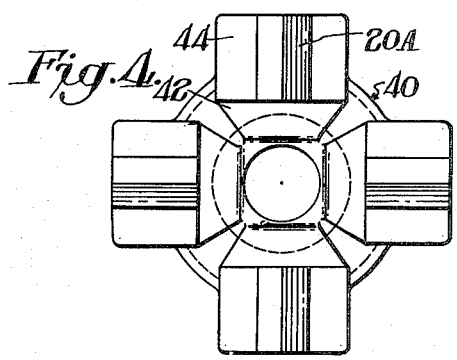
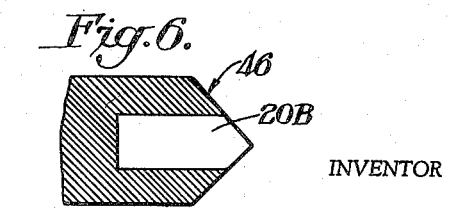
INVENTOR
Albert G. Newbold
BY Connolly and Hutz
ATTORNEYS United States Patent Office 3,189,958
Patented June 22, 1965

3,189,958
METHOD OF BONDING INSERTS INTO CASTINGS
Albert G. Newbold, Lima, Pa., assignor to Trainer Associates Inc., New Castle, Del., a corporation of Delaware
Filed May 12, 1961, Ser. No. 109,559
11 Claims. (Cl. 22—202)

This invention relates to the bonding of inserts within a cast body, and it more particularly relates to such a method for binding pieces of a hard material within a cast metal and a product formed accordingly.

It has been found useful to attach pieces of hard material to various tools, such as those used for crushing, impacting or boring, through the earth, to increase their cutting ability, wear resistance and stiffness. Pieces of tungsten carbide have accordingly been attached to the bodies of drills, hammers and augers by various means such as brazing or mechanical clamping. Since the bodies of such tools are conventionally manufactured of a strong metal such as steel, it would be highly convenient if these pieces of carbide could be directly bonded within the bodies of these tools by casting them as inserts. However, for reasons which are not completely understood, it has not been possible to successfully embed relatively large pieces of carbide within a cast body; and even when some success in casting is achieved, the forces exerted by the metal during pouring and cooling often crack such a piece of carbide. Heretofore it has, therefore, only been possible to embed relatively fine hard particles within a surface of a casting by dispersing them in various pastes or other vehicles which are painted upon a mold wall.

An object of this invention is to provide a method of bonding an insert of appreciable size in a predetermined position within a casting.

Another object is to provide such a method for bonding an appreciably large piece of hard carbide within a steel casting; and A further object is to provide a tool which incorporates the product of such a method.

In accordance with the invention an insert is positioned within a cellular body, such as a foamed plastic, disposed within the cavity. This body has a composition which decomposes to form a gas when it is contacted by the advancing molten metal for promoting the formation of a tight intimate bond between the cast material and the insert. It is believed that this bond is provided by the temporary shielding of the insert by the formed gas from the advancing molten metal, which sweeps the gas in front of it out of the mold through vents in the mold wall. The cellular body and the gas formed from it maintains the insert in a remarkable manner firmly held in the desired position despite its fairly rapid decomposition by the molten metal, and in some way it also prevents an insert, such as a piece of tungsten carbide from cracking while the cast metal is molten, chilling and fully cool.

Novel features and advantages of the present invention will become apparent to one skilled in the art from a reading of the following description in conjunction with the accompanying drawings wherein similar reference characters refer to similar parts and in which:

FIG. 1 is a cross-sectional view in elevation taken through a mold in which the method of this invention is being performed;

FIG. 2 is a cross-sectional view similar to FIG. 1 in a later phase of performance of this invention;

FIG. 3 is a front view in elevation of a product of this invention;

FIG. 4 is a bottom view of the embodiment shown in FIG. 3;

FIG. 5 is a perspective view of another embodiment of the invention; and

FIG. 6 is a cross-sectional view taken through the front edge of the embodiment shown in FIG. 5.

In FIG. 1 is shown a mold 10 including upper section 12 and lower section 14 within which a cavity 16 is formed within a conventional body of casting sand 18 by insertion and withdrawal of a pattern (not shown). Prior to pouring of the molten metal whose front line of advance is indicated by broken lines $a$, $b$, $c$ and $d$, an insert 20 such as a piece of hard tungsten carbide is held in its desired position within cavity 16 by insertion into a body 22 of a cellular material, which is roughly shaped in the manner shown in FIG. 1. Body 22 is, for example, a foam plastic such as a polyurethane foam, polystyrene foam or polyethylene foam or any other type of foam described on page 22 of "Materials in Design Engineering," March 1961, vol. 53, No. 3, published by Reinhold Publishing Corp., 430 Park Avenue, New York city, N.Y.

Body 22 formed of any one of the aforementioned plastic foams is relatively soft and easily cut and formed, and it is therefore conveniently shaped in the manner described and bored out to support insert 20 for example by using an ordinary penknife. The particular composition and density of the foam is governed by its compatability with the formation of the later described intimate bond and the ability of the gases formed by its decomposition to exit through vents 24 in the mold wall which are strategically positioned for allowing the gases formed within the mold to be driven off by the advancing molten metal poured into the mold through gate 26. Its front advances in the manner shown by successive lines $a$, $b$, $c$, and $d$ to fill the mold and envelope insert 20. The molten metal substantially immediately burns and decomposes cellular body 22 upon contacting it and forms a gas barrier between the insert and molten metal. Despite the substantially immediate decomposition of body 22 upon contact upon the molten metal, insert 20 is remarkably firmly and truly held in its desired position within the body of molten metal until it cools sufficiently to rigidly hold it in place. Body 22 may also be made of metallic foams such as aluminum or magnesium foam or of foamed glass as long as the materials used are compatible with the aforementioned results and cast metal. When body 22 is made of a plastic foam, its density should range approximately from one to twenty pounds per cubic foot; and the range from one and one-half to four pounds per cubic foot is particularly effective.

The lower portion 28 of body 22 extends further into the advancing path of the molten metal than indentation 30 in the upper portion of body 22 to hold back the contact of the lower portion of the insert from the first advancing layer of molten metal enough to provide substantially balanced contact of this molten metal about all sides of insert 20. This facilitates retention of insert 20 in place as the gases formed by the decomposition of body 22 are driven off through vents 24. Final advance line "$d$" shows how insert 20 is enveloped in a balanced fashion during final stages of advance of the molten metal 17. This final stage "$d$" is illustrated in FIG. 2 which shows molten metal 17 about to fully envelope insert 20.

When a tungsten carbide insert 20 is bonded within a steel casting in the manner described, in addition to the aforementioned facility of retaining the insert in position despite the rapid decomposition of body 22, the bond 32 formed completely about the contacting surfaces of metal 17 and insert 20 is remarkably adhesive. In fact it is not possible to break this bond without pulling away either some of the cast metal or some of the surface of the insert.

The tenacity of this bond has actually been observed in attempts to pry the insert out of the casting. In such attempts either a portion of the metal sticks to the carbide, or part of the carbide spalls or breaks off.

Although the reasons for the aforementioned remarkably strong retention of the insert in position and the cushioning of the insert against the cracking forces usually exerted by a cast body are not completely understood, it is believed that they are a result of the formation of the gases of decomposition from the cellular body as it is burned by the advancing molten metal. The ability of this cellular material to control the advancing front of the molten metal by virtue of its shaping is also quite important in maintaining the insert properly positioned within the advancing and cooling metal and in reducing the thermal gradient and attendant thermal shock.

The interposition of the gaseous layer between the advancing metal and the wall of the insert also helps scavenge or clean the surface of the insert and maintain a reducing atmosphere between the wall of the insert and the advancing molten metal. This prevents any oxidation of the type which has heretofore occurred when attempts have been made to embed inserts within castings. In these former attempts the formed oxides have permitted only separated areas of contact between the metal and insert which have exerted unbalanced forces upon the insert which result in its cracking. This invention also dispenses with the necessity of utilizing metal chaplets which do not maintain an insert so accurately positioned and introduces difficulties in incorporating the fused metal within the final casting without faults.

In FIGS. 3 and 4 is shown a rotary bit 40 whose body 42 is made of cast steel into which inserts 20A have been cast in the aforementioned manner. Inserts 20A are accordingly intimately bonded all along the contacting surface 44 between matrix metal 42 and inserts 20A. This for the first time provides a means for directly casting tungsten carbide inserts within the cast steel body of a rotary bit of the type used for well drilling.

In FIG. 5 is shown an auger tooth 46 for use in an earth drilling auger incorporating inserts 20B of tungsten carbide bonded within the cast steel body 48. This provides a remarkably convenient manner of directly incorporating hard tungsten carbide particles within the operating edge of a boring tool used for cutting through the ground. Other tools requiring reinforcement for cutting, abrasion resistance, impacting or stiffness can also be conveniently made with hard particles cast within their operating surfaces as well as other forms of cast objects into which various types of inserts may be usefully embedded.

What is claimed is:

1. A method of retaining an insert of refractory hard carbide material within a metal casting formed in the cavity of a mold which comprises the steps of positioning said insert within a foamed organic body disposed within said cavity, arranging suitable vents within said mold to permit gas to be expelled in front of advancing molten metal, pouring the molten metal into said mold, temporarily shielding said insert from said advancing molten metal with said foamed body, decomposing said foamed body into a gas which is compatible with the formation of a tight intimate bond between the cast material and said insert by contacting said foamed body with said molten metal, and holding said insert in position while it is contacted and bound into said molten metal whereby a tight intimate bond is formed between the contacting surfaces of said insert and said metal without cracking said insert.

2. A method as set forth in claim 1 wherein said insert is a piece of tungsten carbide.

3. A method as set forth in claim 2 wherein said piece has a linear dimension of approximately ¼" and larger.

4. A method as set forth in claim 1 wherein said foamed organic body comprises a foam formed of a polymerized plastic material.

5. A method as set forth in claim 4 wherein said foamed plastic is a polyurethane foam.

6. A method as set forth in claim 4 wherein said foamed plastic is polystyrene foam.

7. A method as set forth in claim 4 wherein said foamed plastic is polyethylene foam.

8. A method as set forth in claim 4 wherein the density of said foamed plastic body ranges approximately from one to twenty pounds per cubic foot.

9. A method as set forth in claim 4 wherein the density of said foamed plastic body ranges approximately from one and one-half to four pounds per cubic foot.

10. A method as set forth in claim 1 including the step of providing a greater obstruction for the advancing molten metal in the lower portion of said cavity into which said molten metal advances at an earlier period by positioning the portion of said foamed body in said lower portion further into the path of advance of said molten metal to substantially balance the flow of said molten metal when it contacts said insert in the upper and lower portions of said cavity.

11. A method as set forth in claim 1 including the step of forming an insert receiving opening in said foamed body while said foamed body is in its solid state.

References Cited by the Examiner
UNITED STATES PATENTS

| | | | |
|---|---|---|---|
| 2,260,593 | 10/41 | Wittlinger et al. | 22—202 |
| 2,303,046 | 11/42 | Havlick | 22—202 XR |
| 2,363,272 | 11/44 | Taeyaerts et al. | 22—202 |
| 2,454,910 | 11/48 | Carr | 22—202 |
| 2,698,811 | 1/55 | Legg | 117—51 XR |
| 2,734,000 | 2/56 | Pessel | 117—51 |
| 2,743,495 | 5/56 | Eklund | 22—202 |
| 2,830,343 | 4/58 | Shroyer | 22—196 |

MICHAEL V. BRINDISI, *Primary Examiner.*

MARCUS U. LYONS, *Examiner.*